United States Patent [19]
Keller et al.

[11] Patent Number: 5,957,030
[45] Date of Patent: Sep. 28, 1999

[54] ACTUATOR AND THE PROCESS FOR ITS ASSEMBLY

[75] Inventors: Christoph Keller, Massbach; Gerhard Meyer, Lehrberg; Siegbert Stretz, Ebelsbach, all of Germany

[73] Assignee: Fahrzeugtechnik Ebern GmbH, Germany

[21] Appl. No.: 08/798,567

[22] Filed: Feb. 11, 1997

[30] Foreign Application Priority Data

Feb. 13, 1996 [DE] Germany .............................. 196 05 220

[51] Int. Cl.⁶ ...................................................... F01B 31/14
[52] U.S. Cl. ............................... 92/13.41; 92/13; 92/128; 403/279; 403/282
[58] Field of Search ............................. 92/13, 13.8, 13.4, 92/13.41, 128, 170.1; 403/265, 270, 279, 281, 282

[56] References Cited

U.S. PATENT DOCUMENTS

| | | |
|---|---|---|
| 2,442,306 | 5/1948 | McCormick . |
| 2,736,294 | 2/1956 | Buehner . |
| 3,309,116 | 3/1967 | Johnson et al. .......................... 92/13.41 |
| 3,760,911 | 9/1973 | Porter et al. .............................. 92/13.4 |
| 4,156,793 | 5/1979 | Carlson .................................... 403/215 |
| 4,358,990 | 11/1982 | Takeuchi ................................... 92/13.8 |
| 4,367,674 | 1/1983 | Iwada et al. .............................. 92/13.8 |
| 4,736,674 | 4/1988 | Stoll . |
| 4,909,131 | 3/1990 | Nix et al. ................................. 92/170.1 |
| 5,121,686 | 6/1992 | Schonlau et al. . |

FOREIGN PATENT DOCUMENTS

| | | |
|---|---|---|
| WO 88/08801 | 11/1988 | European Pat. Off. . |
| 2651398 A1 | 5/1978 | Germany . |
| 3149628 A1 | 7/1983 | Germany . |
| 3525029 A1 | 1/1987 | Germany . |
| 3738512 A1 | 5/1989 | Germany . |
| 3816608 A1 | 11/1989 | Germany . |
| 3816610 A1 | 11/1989 | Germany . |
| 2 222 213 | 2/1990 | United Kingdom . |

*Primary Examiner*—Thomas E. Denion
*Attorney, Agent, or Firm*—McAndrews, Held & Malloy

[57] ABSTRACT

An actuating cylinder (2), especially for a hydraulic clutch operation device in a motor vehicle, is disclosed, having a piston unit (6) arranged in a housing (4) and guided via a guide sleeve (8) which is permanently connected to the housing, wherein the piston unit can be displaced by means of a thrust bolt (10). A thrust bolt head (12) is permanently attached directly to the thrust bolt and its relative position with regard to the thrust bolt determines the working stroke (H) of the piston unit, which is done at the time of assembly of the actuating cylinder already. The thrust bolt head is slid onto the thrust bolt and the working stroke between the guide sleeve and the thrust bolt head is adjusted before the thrust bolt head is attached to the thrust bolt. The actuating cylinder and its assembly are simplified according to this invention, so that subsequent work in adjusting the working stroke can be eliminated.

17 Claims, 3 Drawing Sheets

ACTUATOR AND THE PROCESS FOR ITS ASSEMBLY

CROSS-REFERENCE TO RELATED INVENTIONS

Not Applicable

BACKGROUND OF THE INVENTION

The invention concerns an actuating cylinder according to the definition of the species of Patent claim 1 and a method for assembling same according to Patent claim 12. In particular, the invention concerns an actuating cylinder for a hydraulic clutch operation device in a motor vehicle such as those mass produced in the industry.

German Patent Publication DE 3,816,608 A1 discloses an actuating cylinder having a housing in which there is a piston that is guided by a guide part and can be displaced by means of a piston rod. This actuating cylinder serves as a master cylinder in a hydraulic clutch operation device, which is connected by the piston rod to the clutch pedal of the motor vehicle and is connected by a pressure line to a slave cylinder, so that the pressure generated in the pressure chamber of the actuating cylinder due to the displacement of the piston when the clutch pedal is depressed can be transmitted to the slave cylinder through the liquid column in the pressure line. As a result, the release bearing of the clutch of the motor vehicle is acted on by the slave cylinder with an actuating force to separate the clutch thrust plate from the clutch driving plate by a release mechanism and thus separate the combustion engine from the transmission of the motor vehicle.

With this state of the art, the end of the piston on the pressure chamber side of the actuating cylinder that forms a receptacle for the piston rod on the side facing away from the pressure chamber is made of plastic. In operation of the actuating cylinder, it is essential to prevent the piston from striking the bottom of the housing of the actuating cylinder when the clutch pedal is depressed, because the excess actuating forces, also referred to as forces of improper use, could result in an excessive pressure burden between the piston and the housing bottom on the one hand and the piston and piston rod on the other hand, which could lead to damage to the piston. To prevent this, the end of the piston rod on the pedal side is provided with a thread onto which a nut is screwed as a lock nut when the actuating cylinder is installed in the motor vehicle, wherein the lock nut works together with a stationary control element to limit the working stroke of the piston.

Although with this prior art, smooth guidance of the piston in the housing of the actuating cylinder is assured by the guide part, it is a disadvantage here that adjusting the working stroke of the piston requires additional steps when the actuating cylinder is installed in the motor vehicle, and this can be relatively expensive due to the scattering in manufacturing tolerances on the actuating cylinder and the clutch pedal or pedal block.

The same problem is also encountered with the actuating cylinder known from German Patent Publication DE 3,816,610 A1, which differs from the prior art according to German Patent Publication DE 3,816,608 A1 in that the guide part is detachably attached to the housing of the actuating cylinder by means of a threaded section.

Furthermore, German Patent Publication DE 3,149,628 A1 discloses an actuating cylinder whose piston is provided with a central valve on the end on the side of the pressure chamber. This piston also must not strike the bottom of the housing of the actuating cylinder because that could cause damage to the central valve. According to this state of the art, the end of the piston rod on the pedal side is provided with a piston rod head having a fastening eye by means of which the piston rod is operatively connected to the clutch pedal. The working stroke of the piston is limited here between the clutch pedal and the pedal block, both of which must have a narrow tolerance when the actuating cylinder is completely preassembled, which is associated with a high manufacturing cost accordingly.

In addition, it is also known, e.g., from German Patent Publication DE 3,738,512 A1 that the piston of a slave cylinder can be designed so it can strike the housing bottom of the slave cylinder without being damaged. However, with this state of the art there are problems in that the piston must be made of suitably strong materials, which are thus also expensive, and/or the pistons must be made of larger dimensions accordingly to have adequate strength in view of the forces of improper use that can be expected.

Finally, German Patent Publication DE 3,525,029 A1 discloses a piston-cylinder arrangement where the stroke is limited by a stop mechanism consisting of a fixed stop mounted on the outside of the cylinder and a counterstop that works together with it. The counterstop consists of a threaded section provided on the piston rod on which is screwed a threaded ring that is detachably secured in the axial direction of the piston rod by means of a retention device in the form of a counternut or a locking screw that sits in a threaded bore introduced radially into the threaded ring. This prior art suffers from the disadvantage that the design of the counterstop and its assembly on the piston rod are relatively expensive.

BRIEF SUMMARY OF THE INVENTION

In comparison with the prior art described above, starting from the prior art according to German Patent Publication DE 3,816,610 A1, for example, the invention is therefore based on the object of creating an actuating cylinder with a simple design that can be installed in an economical manner by means of a suitable method.

According to this invention, a thrust bolt head is permanently attached directly to the thrust bolt of the piston unit of the actuating cylinder, i.e., without using other parts such as lock nuts, stud screws, etc., wherein the working stroke of the piston unit is defined by the relative position of this thrust bolt head with respect to the thrust bolt. Thus, no additional adjusting or limiting elements are needed on the actuating cylinder, the clutch pedal and/or the pedal block to adjust the working stroke of the piston unit, which permits inexpensive assembly of the actuating cylinder in mass production. In addition, this design of the actuating cylinder has the advantage that the stroke of the actuating cylinder cannot change inadvertently during operation.

In the method according to this invention for assembly of the actuating cylinder, the preassembled piston unit and the guide sleeve are inserted into the housing without the thrust bolt head and the guide sleeve is attached to the housing, and then the piston unit is shifted as far as a stop in the direction of the guide sleeve and the thrust bolt is secured (temporarily) with respect to the housing until in the next step the thrust bolt head is slid onto the thrust bolt while at the same time adjusting the working stroke of the piston unit and finally the thrust bolt head is attached to the thrust bolt.

As a result, the working stroke of the piston unit can be adjusted already accurately in an advantageous manner when assembling the actuating cylinder, thus eliminating subsequent adjusting work, for example, when the actuating cylinder is installed in a motor vehicle. The scattering in tolerance of the dimensions of the thrust bolt connection depends only on the assembly process or the assembly tool, wherein manufacturing tolerances in the individual parts are compensated in the assembly process. This permits a relatively wide tolerance for the pedal and pedal block which are made mainly of sheet metal, which offers cost advantages especially in mass production.

The thrust bolt head has an orifice to accommodate the end of the thrust bolt facing away from the piston unit, wherein the working stroke of the piston unit can be adjusted variably by the depth to which the thrust bolt is embedded in the orifice when assembling the actuating cylinder. This makes it possible to create a modular system and reduce the number of parts, because different working strokes of the piston unit can be implemented with the same parts.

The thrust bolt head for attaching to the thrust bolt undergoes plastic deformation, which is possible with a relatively low assembly cost.

The thrust bolt head may be made of a plastic and the thrust bolt to be made of metal and be provided with a profiled section on the end that is accommodated in the orifice in the thrust bolt head. During assembly of the actuating cylinder, this profiled section is secured in the blind hole of the thrust bolt head by hot embedding, as specified in Patent claim 17. In addition to the fact that it is advantageous from the standpoint of the manufacturing technology to make the thrust bolt head of plastic, because no insertion parts such as bolts, molding parts, etc. need be placed in the plastic injection molding molds, the proposed type of mounting also has the advantage that the thrust bolt head can easily be attached to the thrust bolt in one operation.

The profiled section of the thrust bolt has a knurled profile that can be formed on the thrust bolt in a manner advantageous from the standpoint of the manufacturing technology.

In addition, the thrust bolt head has a fastening eye on the end facing away from the piston unit to introduce the forces for actuation of the actuating cylinder. Thus, the actuating cylinder can easily be connected to the clutch pedal or a pedal rod by means of a cotter pin.

According to an alternative design the thrust bolt head is essentially spherical in shape on the end facing away from the piston unit to create a snap connection with an essentially complementary shaped receptacle provided on the actuating side. This snap connection serves to introduce forces for operating the actuating cylinder. This design of the thrust bolt head further facilitates assembly of the actuating cylinder.

According to a preferred embodiment of the working stroke limit for the piston unit. Accordingly, the guide sleeve has a ring-shaped stop face on the side facing away from the piston unit and this stop face can be brought into contact with a ring face of the thrust bolt head provided on the side of the thrust bolt head facing toward the piston unit to thus limit the working stroke of the piston unit. According to Patent claim 14, the working stroke of the piston unit is adjusted during assembly of the operating cylinder between this stop face of the guide sleeve and the above-mentioned ring face of the thrust bolt head.

Since the working stroke is limited at the actuating cylinder itself, this eliminates in an advantageous manner the relative dimensions and tolerances between the actuating cylinder and the clutch pedal or pedal block. Consequently, dimensional chains are necessarily avoided, whereby the individual parts need to be manufactured only with a less narrow tolerance in comparison with the prior art while at the same time the manufacturing cost is reduced. This also assures that the anticipated forces of improper use will be introduced via the guide sleeve into the housing, so that the piston unit is not subjected to additional stress due to improper use and it need be designed only with regard to its hydraulic function.

According to Patent claim 9, the guide sleeve has an internal ring section that guides the piston unit and has a stop face as well as an outside ring section that is connected to the housing, wherein the internal ring section is attached to the outside ring section by a web and a plurality of longitudinal ribs. The guide sleeve designed in this way is very short in an advantageous manner.

One aspect of the present invention, the housing and the guide sleeve are preferably made of a plastic that can be welded by ultrasonic welding, and according to Patent claim 18 they are attached to each other by ultrasonic welding during assembly of the actuating cylinder. This type of mounting requires only a small amount of equipment for assembly work.

Another type of connection is described in Patent claim 11, according to which the guide sleeve is connected to the housing by a snap connection, wherein according to Patent claim 19 the guide sleeve is locked to the housing when the actuating cylinder is assembled. With this type of connection, the assembly steps insertion of the guide sleeve into the housing and attaching the guide sleeve to the housing are integrated in an advantageous manner.

BRIEF DESCRIPTION OF THE SEVERAL VIEWS OF THE DRAWINGS

The invention is explained in greater detail below with reference to a preferred embodiment as illustrated in the figures, which show the following:

FIG. 1 shows the preferred embodiment of an actuating cylinder 2 in an inoperative state. According to FIG. 1, actuating cylinder 2 has a housing 4 which accommodates a piston unit 6 that can be displaced axially. Piston unit 6 is guided via a guide sleeve 8 and can be displaced in housing 4 by a thrust bolt 10. Guide sleeve 8 is permanently connected to housing 4 and forms a stop for a thrust bolt head 12 on thrust bolt 10 in the embodiment illustrated here to limit the working stroke H of piston unit 6 in housing 4.

Figure 1:
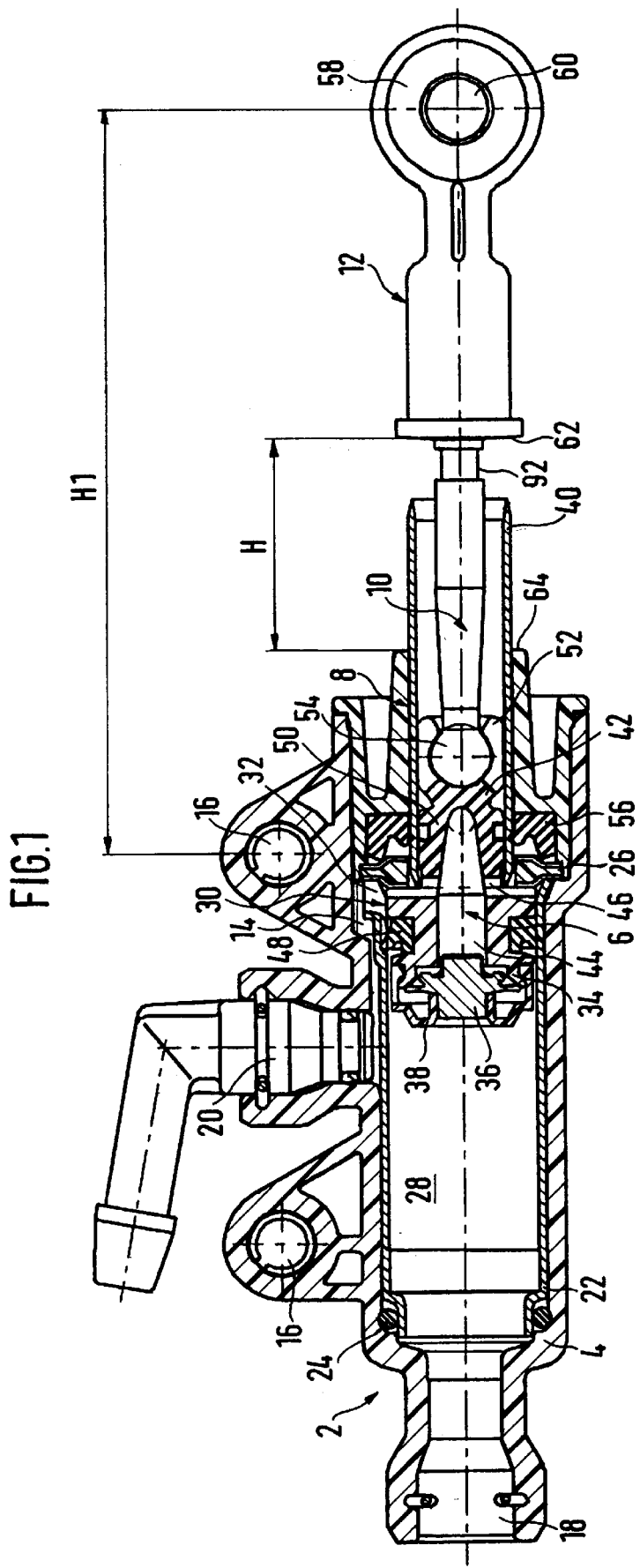
FIG. 1 shows a sectional view of a preferred embodiment of an actuating cylinder.

Housing 4 is preferably made of plastic and ha a stepped housing bore 14. Furthermore, housing 4 is provided with two fastening eyes 16 arranged with an axial distance between them and radial spacing relative to the housing bore 14 for the purpose of mounting the actuating cylinder 2 in the motor vehicle. Housing 4 also has a connection 18 running coaxially with housing bore 14 on the end opposite the open end of housing bore 14, via which the actuating cylinder 2 can be hydraulically connected to a slave cylinder (not shown) with the interposition of a pressure line. Finally, housing 4 has another connection 20 that runs radially away from the housing bore 14 between the fastening eyes 16, via which the actuating cylinder 2 can be connected to an equalizing tank (not shown).

Inside housing bore 14 there is a liner 22, preferably metallic, whose one end extends to the connection 18 for the slave cylinder and has a gasket 24 around the periphery and in contact with the inside wall of housing bore 14. The other end of liner 22 is flush with the radially outermost ring-shaped face of a supporting disk 26 made of plastic, which is held in the axial and radial directions by guide sleeve 8 which is permanently connected to housing 4. Liner 22 forms the cylinder wall of actuating cylinder 2 along which piston unit 6 can be displaced and thus it defines the pressure space 28 of the actuating cylinder 2 in the radial direction. Furthermore, a pressure equalizing and resupplying system 30 is provided on the end of liner 22 facing toward the supporting disk 26 and has an orifice 32 via which the pressure space 28 is hydraulically connected in a known way to the connection 20 for the equalizing tank when the actuating cylinder 2 is not being operated, i.e., when piston unit 6 is in the position illustrated in FIG. 1 where it is resting on the stop on the ring-shaped end face of supporting disk 26 which is on the radially inner side facing toward the pressure space 28.

Starting from the hydraulic acting surface that defines the pressure space 28 in the axial direction, piston unit 6 consists of piston head 34 with a central valve mounted on it, having a valve part 36 and a holder 38 for valve part 36, and a preferably metallic shaft part 40 that tightly surrounds a cylindrical projection 42 of piston head 34 having a smaller diameter on the end of piston head 34 facing away from pressure space 28. Shaft part 40 is slid onto the cylindrical projection 42 of piston head 34 to the extent that its end face on the pressure space side is flush with the piston head 34.

Piston head 34 is preferably made of plastic and is provided with a blind hole 44 and a transverse bore 46 by means of which the pressure space 28 is hydraulically connected to the pressure equalizing and resupply system 30 when valve part 36 is lifted up from its seat. Between the central valve and the transverse bore 46, piston head 34 has a sealing element 48 in a groove formed on its circumference, which hydraulically separates the pressure space 28 from the pressure equalizing and resupply system 30 when the actuating cylinder 2 is actuated. The cylindrical projection 42 of the piston head 34 is also provided with a groove which holds a gasket 50 that is in close contact with the inside wall of shaft part 40. Two ball catch hooks 52 are provided on the piston head 34 at the end of cylindrical projection 42 facing away from the pressure space 28 to accommodate a ball part 54 on thrust bolt 10 so that thrust bolt 10 is secured in the axial direction with regard to piston unit 6.

As a result, piston head 34, valve part 36, holder 38, shaft part 40, cylindrical projection 42 of piston head 34, sealing element 48, gasket 50 and ball catch hook 52 together form piston unit 6 that can be displaced as a unit by means of thrust bolt 10 in housing 4. Piston unit 6 is guided with shaft part 40 in guide sleeve 8 and the actuating cylinder 2 is sealed with respect to the environment at the open end of housing bore 14 by means of a sealing element 56 that is inserted into guide sleeve 8 and works together with the outside peripheral surface of shaft part 40.

At the end of thrust bolt 10 facing away from the pressure space 28, thrust bolt head 12 is attached directly and permanently to thrust bolt 10, as explained in greater detail below with reference to FIG. 3. Thrust bolt head 12 is preferably made of plastic and has a parallel flattened fastening eye 58 on its end facing away from pressure space 28 with a through hole 60 perpendicular to the longitudinal axis of the thrust bolt head 12, via which the actuating cylinder 2 can be connected to the clutch pedal or a clutch rod of the motor vehicle with the help of a cotter pin (not shown). Instead of fastening eye 58, a spherical end (not shown) may also be provided on thrust bolt head 12, which forms a snap-lock connection made of plastic together with an essentially complementary shaped receptacle on the pedal side so as to further facilitate assembly of the actuating cylinder 2 at the site of use.

At the end, thrust bolt head 12 has a ring face 62 that faces toward pressure space 28 and has a diameter such that when thrust bolt head 12 is depressed in the direction of pressure space 28, the ring face 62 comes to rest against a ring-shaped stop face 64 of guide sleeve 8 provided on the end of guide sleeve 8 facing away from pressure space 28 to limit the working stroke H of piston unit 6 in the direction of operation of actuating cylinder 2, i.e., to the left in FIG. 1.

Figure 2:
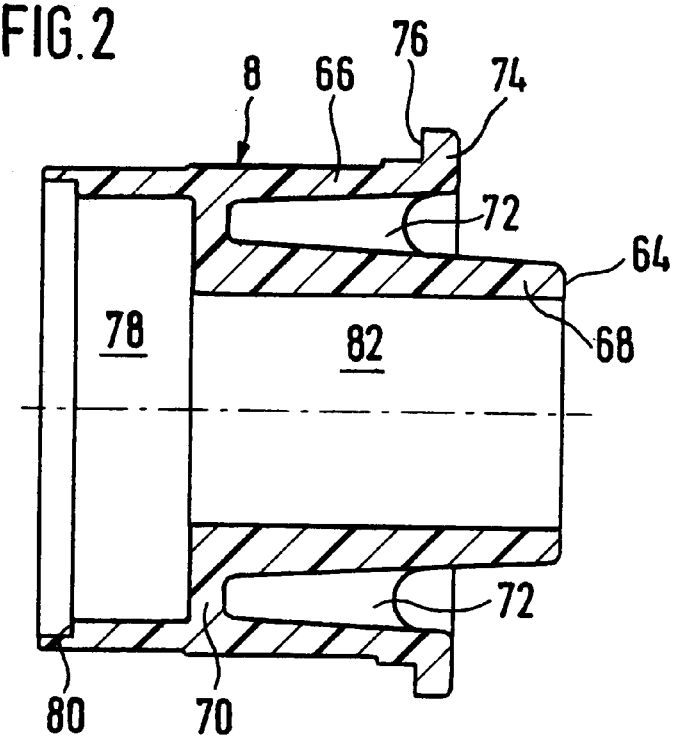
FIG. 2 shows an enlarged sectional view of the guide sleeve of the actuating cylinder according to FIG. 1.

FIG. 2 shows an enlarged view of guide sleeve 8. Guide sleeve 8 is preferably made of plastic and is designed with rotational symmetry. Guide sleeve 8 has an outside ring section 66 that concentrically surrounds an inside ring section 68 and is connected to it by a ring-shaped web 70 and a plurality of longitudinal ribs 72 extending radially away from the inside ring section 68 to the outside ring section 66, and serving to increase the strength of the part.

The outside ring section 66 is provided with a collar 74 on the end facing away from the pressure space 28 in FIG. 1. When guide sleeve 8 is installed, this collar is in flush contact with housing 4 at its ring-shaped face 76 that faces toward the pressure space 28. The outside diameter of the outside ring section 66 is such that the guide sleeve 8 is fitted in the housing bore 14 of housing 4 essentially without any tolerance. From the side facing toward the pressure space 28, the outside ring section 66 is provided with a recess 78 with steps in the inside diameter, which recess forms a ring-shaped shoulder 80 on which the supporting disk 26 is supported when guide sleeve 8 is installed in order to secure liner 22 in the housing bore 14 in the axial direction. The larger inside diameter of recess 78 is only slightly larger than the outside diameter of supporting disk 26 so that the disk can be accommodated in the forward section of recess 78 relative to the pressure space 28 with essentially no tolerance. The rear section of recess 78 relative to pressure space 28 has a smaller inside diameter than the forward section of recess 78, it ends at web 70 which is flush with the end face of the inside ring section 68 facing toward the pressure space 28 and it forms a receptacle for sealing element 56.

The inside ring section 68 of guide sleeve 8 is provided with a central through-hole 82. The inside diameter of the central through-hole 82 and the length of the inside ring section 68 are selected so that the inside wall of the central through-hole 82 can guide shaft part 40 of piston unit 6 without presenting excessive frictional resistance to it in the movement of piston unit 6, so that the actuating forces needed to displace piston unit 6 are not too great. The inside ring section 68 of guide sleeve 8 need not necessarily project axially out of the outside ring section 66 of guide sleeve 8. Finally, the end of the inside ring section 68 facing away from the pressure space 28 forms the above-mentioned stop face 64 for thrust bolt head 12.

In the embodiment illustrated in FIG. 1, the housing 4 and the guide sleeve 8 are preferably made of plastics that can be welded ultrasonically so that guide sleeve 8 can be secured in housing bore 14 of housing 4 by an ultrasonic welding process so it cannot be shifted, after guide sleeve 8 has been slid into housing bore 14 to the extent that the end face 76 of collar 74 is in flush contact with the end face of housing 4 that faces away from pressure space 28. With this type of mounting, the outside peripheral surface of the outside ring section 66 and the corresponding inside peripheral surface of housing bore 14 are fused at the surface by emitting through them ultrasonic waves so that a fused bond is formed between guide sleeve 8 and housing 4.

However, it is also possible to design the guide sleeve as a simple insertion part, whereby instead of the collar of the outside ring section of the guide sleeve, a separate ring part made of a plastic that can be welded ultrasonically is provided and is bonded by ultrasonic welding to the end face of the housing facing away from the pressure space and to an end face of the outside ring section of the guide sleeve which also faces away from the pressure space after the guide sleeve has been inserted into the housing bore to the extent that the above-mentioned end faces of the housing and the outside ring section are flush with each other.

The guide sleeve can in principle also be attached to the housing by means of a snap connection. With this type of connection, the guide sleeve has tongues that are integral with the guide sleeve and have undercut notches that lock in corresponding recesses in the housing when the guide sleeve is installed in the housing bore in order to connect the guide sleeve firmly to the housing. With this type of mount, the tongues and recesses should be dimensioned such that the snap connection can safely accommodate the forces due to improper use that occur when the thrust bolt head comes in contact with the guide sleeve to the same extent as the ultrasonically welded connection described above.

Finally, the guide sleeve could also be glued with adhesive in the housing bore to bond the guide sleeve permanently to the housing. However, the type of connection, which is the most favorable from the standpoint of manufacturing technology, is the ultrasonic welding of guide sleeve 8, designed as shown in FIG. 2, to housing 4, because this guide sleeve has a simple shape, no additional parts are required and assembly of guide sleeve 8 on housing 4 can also be accomplished without any additional assembly steps, such as applying an adhesive, etc.

Figure 3:
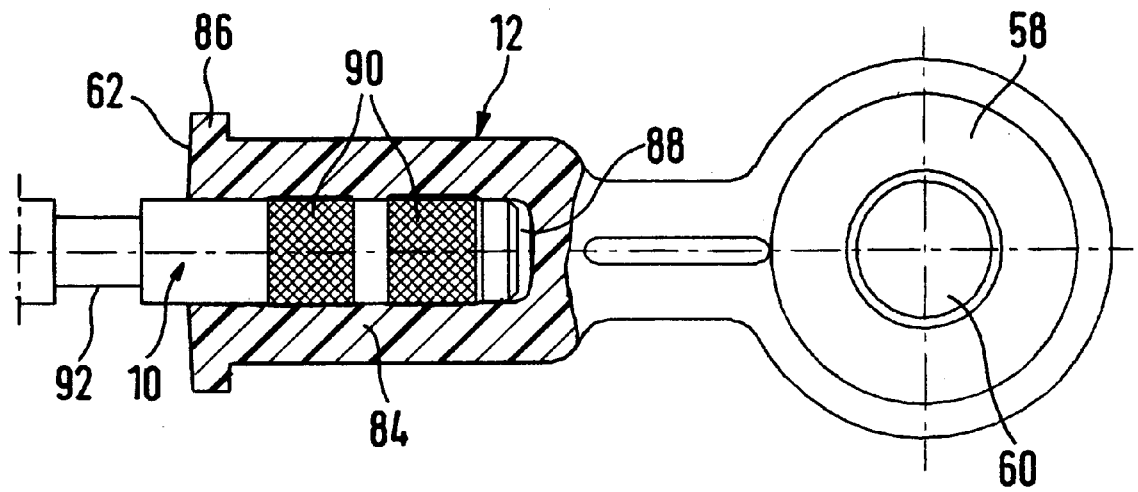
FIG. 3 shows an enlarged sectional view of the thrust bolt head attached to the thrust bolt of the actuating cylinder according to FIG. 1.
Figure 4:
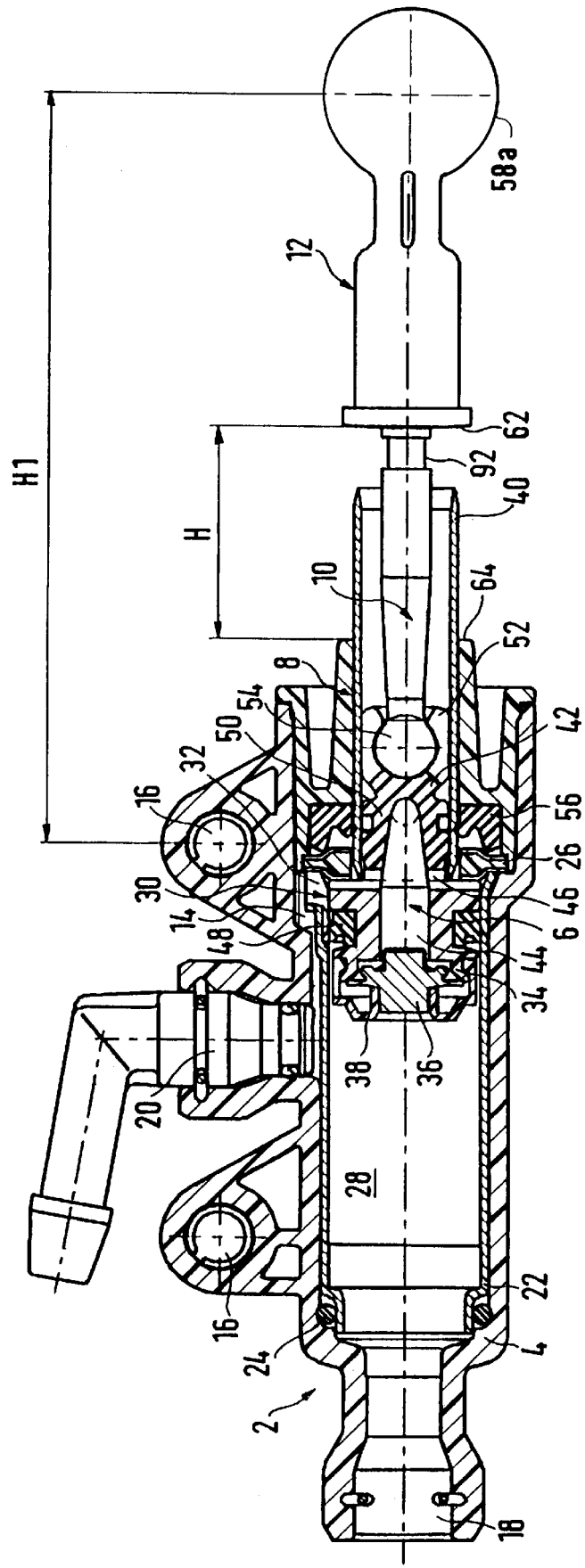
FIG. 4 shows a section view of an actuating cylinder having a spherical, snap typed connector on the end that faces away from the piston unit.

FIG. 3 shows the end of thrust bolt 10 facing away from pressure space 28 in FIG. 1 with thrust bolt head 12 attached to it. Thrust bolt head 12 has a cylindrical section 84 that develops into the parallel flattened fastening eye 58 at the end of thrust bolt head 12 facing away from pressure space 28. Cylindrical section 84 has a collar 86 on the end facing toward pressure space 28 forming the ring face 62 for limiting the working stroke of piston unit 6 and is provided with a centric orifice in the form of a blind hole 88 that starts from collar 86 and serves to accommodate the end of thrust bolt 10 that faces away from pressure space 28. At its bottom, blind hole 88 has a vent hole (not shown) through which air in the blind hole 88 can escape when thrust bolt head 12 is joined to thrust bolt 10. Instead of blind hole 88, thrust bolt head 12 can also be provided with a stepped hole (not shown) as a receptacle hole for thrust bolt 10, smaller in diameter starting from the ring face 62 of collar 86 and ending in through-hole 60 of fastening eye 58.

The end of thrust bolt 10 facing away from pressure space 28 is provided at its circumference with a knurled section 90 or a section with a comparable profile that serves to fasten thrust bolt head 12 to the thrust bolt 10. Finally, thrust bolt 10 has a groove 92 between knurled section 90 and its section surrounding shaft part 40 of piston unit 6 in the installed state. In assembly of actuating cylinder 2, this groove serves to temporarily secure the axial position of thrust bolt 10.

Preferably a hot embedding method is used to attach the thrust bolt head 12, which is preferably made of plastic, to metallic thrust bolt 10. In this method, thrust bolt 10 may be heated inductively, for example, while at the same time it is pressed into the blind hole 88 of thrust bolt head 12, wherein the inside circumferential surface of blind hole 88 is fused locally so that essentially a fused bond is formed between the cylindrical section 84 of thrust bolt head 12 and knurled section 90 of thrust bolt 10, which bond has an adequate tensile and compressive strength in view of the actuating forces that occur. The tensile and compressive strength of this connection can be increased by providing a thrust bolt 10 where the cross-sectional area of the section embedded in cylindrical section 84 of thrust bolt head 12 is enlarged locally, e.g. by stepping the diameter of thrust bolt 10 in the area of knurled section 90.

It is also possible to attach the thrust bolt head to the thrust bolt by means of an ultrasonic welding process. To do so, ultrasonic waves are directed into the cylindrical section of the thrust bolt head after positioning the thrust bolt head on the thrust bolt, causing the inside surface of the blind hole in the thrust bolt head to fuse locally and thus forming essentially a fused bond between the cylindrical section of the thrust bolt head and the knurled section of the thrust bolt. However, if the thrust bolt is a surface-coated metal part, the heat embedding method described above is preferable, because the surface layers may separate from the thrust bolt upon emitting the ultrasonic waves and may have a negative effect on the connection between the thrust bolt and its head.

Finally, another possible connection would consist of making the thrust bolt head of metal and crimping its cylindrical section with the end of the thrust bolt facing away from the pressure space. Here again, however, the heat embedding method described above is also preferable, because it is expensive to manufacture a thrust bolt head of metal and crimping metal parts requires special equipment.

However, all the connection options described here have in common the advantage that by plastic deformation of thrust bolt head 12 no additional parts are needed to connect thrust bolt head 12 to thrust bolt 10.

The diameter of collar 86 of thrust bolt head 12 and thus ring face 62 of thrust bolt head 12 as well as the diameter and wall thickness of the inside ring section 68 of guide sleeve 8 and thus the size of the stop face 64 of guide sleeve 8 are coordinated in design such that thrust bolt head 12 with ring face 62 can flatly abut against stop face 64 of guide sleeve 8 without thrust bolt head 12 interfering with the outside ring section 66 of guide sleeve 8.

Operation of actuating cylinder 2 differs from operation of a conventional actuating cylinder only inasmuch as the guide sleeve 8 which is permanently connected to housing 4 forms a stop not only in the pulling phase of the actuating cylinder 2 but also in its compression phase.

Guide sleeve 8 limits the working stroke H of piston unit 6 when piston unit 6 is displaced by depressing piston bolt head 12 in the direction of pressure space 28, i.e. to the left in FIG. 1, because the thrust bolt head 12 with its ring face 62 formed on collar 86 comes to rest against stop face 64 of the inside ring section 68 of guide sleeve 8. The excess actuating forces or forces of improper use are then introduced into housing 4 from thrust bolt head 12 via its ring face 62, stop face 64 of guide sleeve 8, its inside ring section 68, web 70 and longitudinal ribs 72, the outside ring section 66, collar 74 and end face 76 as well as over the fused bond between the outside peripheral surface of the outside ring section 66 and the inside peripheral surface of housing bore 14, so that the piston unit 6 is not affected by forces due to improper use.

When piston unit 6 moves to the right in FIG. 1, i.e., in the pulling phase of actuating cylinder 2, piston unit 6 with its piston head 34 strikes the radially inner ring-shaped end face of supporting disk 26 which is supported on shoulder 80 in recess 78 of guide sleeve 8. The excess forces in the pulling phase of actuating cylinder 2, which are definitely much smaller in amount than the forces of improper use in the compression phase of the actuating cylinder 2, are introduced into housing 4 from piston head 34 of piston unit 6 via supporting disk 26, shoulder 80 of guide sleeve 8, its outside ring section 66 and the fused bond between the outside peripheral surface of the outside ring section 66 and the inside peripheral surface of housing bore 14.

Assembly of the actuating cylinder 2 described above is explained below, where the working stroke H of piston unit 6 is also adjusted.

First, housing 4 is secured on an assembly device by means of the integral fastening eyes 16 for the assembly process. Then the preassembled piston unit 6 to which thrust bolt 10 is attached by the ball snap hook 52 and ball part 54 is inserted into housing bore 14 of housing 4. Thrust bolt head 12 has not yet been attached to thrust bolt 10 at this time. Next, guide sleeve 8 which has already been positioned on shaft part 40 of piston unit 6 and in whose recess 78 both supporting disk 26 and sealing element 56 are arranged is inserted into housing bore 14 until the end face 76 of collar 74 on the outer ring section 66 of guide sleeve 8 is flush against the end face of housing 4 which faces away from pressure space 28. Then ultrasonic welding is performed on the outside circumferential surface of the outside ring section 66 of guide sleeve 8 to join it to the inside peripheral surface of housing bore 14, as described above, using an ultrasonic welding device integrated into the assembly device.

If a snap-action connection is provided to attach the guide sleeve, the guide sleeve is attached to the housing as soon as it has been inserted into the housing bore since the tongues of the guide sleeve lock in the corresponding recesses in the housing.

In the next assembly step, the piston unit 6 is pulled in the direction of the guide sleeve 8 over shaft part 40 or thrust bolt 10 until the piston head 34 of piston unit 6 is in contact with the radial inner ring-shaped end face of supporting disk 26, which is supported on the shoulder 80 in recess 78 of guide sleeve 8. Thrust bolt 10 is temporarily secured in groove 92 in the axial direction with respect to housing 4 between knurled section 90 of thrust bolt 10 and the end of shaft part 40 of piston unit 6 facing away from pressure space 28.

Then, thrust bolt head 12 is slid in the axial direction of thrust bolt 10 onto the end of thrust bolt 10 which is provided with knurled section 90, wherein knurled section 90 of thrust bolt 10 enters blind hole 88 of thrust bolt head 12. At the same time, the working stroke H of piston unit 6 is adjusted between ring face 62 of thrust bolt head 12 and stop face 64 of guide sleeve 8.

As an alternative, the distance between another predetermined location on housing 4 and another predetermined location on thrust bolt head 12 may also be used as the reference dimension for the working stroke H of piston unit 6, for example, the horizontal distance (shown as H1 in FIG. 1) between the center of the through hole 60 in thrust bolt head 12 and the center of fastening eye 16 on housing 4 or the stop face of a flange (not shown) of housing 4 that serves to mount actuating cylinder 2 in a motor vehicle. Precisely the reference dimension H1 mentioned as an example between the location where the clutch pedal is connected to actuating cylinder 2 and a mounting point of housing 4 in the motor vehicle can be used to advantage if the stroke of piston unit 6 is to be limited by the clutch pedal coming to rest against the pedal block. In this case, care should of course be taken through appropriate dimensioning of reference dimension H1 to assure that ring face 62 of piston head 12 cannot strike stop face 64 of guide sleeve 8 but instead the stroke of piston unit 6 is limited in advance by the stopping of the clutch pedal on the pedal block.

When adjusting the working stroke H of piston unit 6, the end of thrust bolt 10 facing away from pressure space 28 is spaced apart from the bottom of blind hole 88. Through suitable stepping in the depth and diameter of blind hole 88 in cylindrical section 84 it is possible to create a modular system for different actuating cylinders with different thrust bolt diameters and working strokes, respectively.

Finally, thrust bolt head 12 is permanently attached to thrust bolt 10. To do so, in the embodiment illustrated here, the knurled section 90 of the thrust bolt 10 is embedded with heat in the inside peripheral surface of blind hole 88. For this purpose, thrust bolt 10 is already heated when thrust bolt head 12 is slid onto it and the heat supply is interrupted after adjusting the working stroke H so that thrust bolt head 12 is essentially fused to thrust bolt 10 and thus is permanently attached.

An actuating cylinder, in particular for a hydraulic clutch operation device in a motor vehicle, is disclosed, having a piston unit that is arranged in a housing and is guided via a guide sleeve permanently attached to the housing, wherein the piston unit can be displaced by means of a thrust bolt. A thrust bolt head is permanently attached directly to the thrust bolt, wherein the working stroke of the piston unit is determined by the relative position of the thrust bolt head relative to the thrust bolt, which is accomplished at the time of assembly of the actuating cylinder already. The thrust bolt head is slid onto the thrust bolt and the working stroke between the guide sleeve and the thrust bolt head is adjusted before the thrust bolt head is attached to the thrust bolt. The actuating cylinder and its assembly are simplified according to this invention and subsequent work in adjusting the working stroke can be eliminated.

What is claimed is:

1. An actuating cylinder with a piston unit arranged in a housing and guided via a guide sleeve permanently connected to the housing, the piston unit being displaceable by means of a thrust bolt, wherein a thrust bolt head is permanently attached directly to the thrust bolt with plastic deformation such that a working stroke of the piston unit is defined by the relative position of the thrust bolt head relative to the thrust bolt.

2. An actuation cylinder according to claim 1, wherein the thrust bolt head has an orifice to accommodate the end of the thrust bolt facing away from the piston unit, and wherein the working stroke of the piston unit can be adjusted variably by the depth to which the thrust bolt is embedded in the orifice.

3. An actuating cylinder according to claim 1, wherein the thrust bolt head has a fastening eye on the end facing away from the piston unit, the fastening eye serving to introduce forces for operating the actuating cylinder.

4. An actuating cylinder according to claim 1, wherein the thrust bolt head is essentially ball-shaped on its end that faces away from the piston unit so as to form a snap-type connection with a receptacle of an essentially complementary shape on the actuating side, thus serving to introduce forces for operating the actuating cylinder.

5. An actuating cylinder according to claim 1, wherein the guide sleeve has a ring-shaped stop face on the side facing away from the piston unit, wherein the stop face can be brought to a stop with a ring face of thrust bolt head on the side of thrust bolt head facing toward the piston unit so as to limit the working stroke of the piston unit.

6. An actuating cylinder according to claim 8, wherein the guide sleeve has an inside ring section that guides the piston unit and has the stop face as well as an outside ring section connected to housing, wherein the inside ring section is connected to the outside ring section by a web and a plurality of longitudinal ribs.

7. An actuating cylinder according to claim 1, wherein the housing and the guide sleeve are made of an ultrasonically weldable plastic, and they are welded together by ultrasonic welding.

8. An actuating cylinder according to claim 1, wherein the guide sleeve is connected to the housing by means of a snap connection.

9. An actuating cylinder with a piston unit arranged in a housing and guided via a guide sleeve permanently connected to the housing, the piston unit being displaceable by means of a thrust bolt the thrust bolt, wherein the thrust bold head is made of a plastic and has an orifice to accommodate an end of the thrust bolt, while the thrust bolt is made of metal and has a profiled section on its end that is accommodated in the orifice of the thrust bolt head, the profiled section being secured by heat embedding in the orifice of the thrust bolt head such that a working stroke of the piston unit is defined by the relative position of the thrust bold head relative to the thrust bolt.

10. An actuating cylinder according to claim 9, characterized in that the profiled section of the thrust bolt has a knurled section.

11. A method for assembling an actuating cylinder with a piston unit arranged in a housing and guided via a guide sleeve permanently connected to the housing, the piston unit being displaceable by means of a thrust bold to which a thrust bold head is permanently and directly attached with plastic deformation such that a working stroke of the piston unit is defined by the relative position of the thrust bold head relative to the thrust bolt the method comprising the following steps:

(a) inserting the preassembled piston unit and the guide sleeve without thrust bolt head into the housing and attaching the guide sleeve to the housing, then (b) shifting the piston unit until it comes to a stop in the direction of the guide sleeve, and securing the thrust bolt with regard to the housing, (c) sliding the thrust bolt head onto the thrust bolt while at the same time adjusting a working stroke of the piston unit, and (d) attaching the thrust bolt head to the thrust bolt by plastic deformation of the thrust bolt head.

12. A method according to claim 11, wherein the working stroke of the piston unit is adjusted between the guide sleeve and the thrust bolt head.

13. A method according to claim 12, wherein the working stroke of the piston unit is adjusted between a ring-shaped stop face on the side of the guide sleeve facing away from the piston unit, and the ring face on the side of the thrust bolt head facing toward the piston unit.

14. A method according to claim 11, wherein the working stroke of the piston unit is adjusted by means of a reference dimension between a position on the thrust bolt head that serves to introduce the actuating forces and a fastening point (16) on the housing.

15. A method according to claim 11, wherein the thrust bolt head is made of plastic, the thrust bold is made of metal, and the thrust bold head is attached to the thrust bolt by hot embedding of a profiled section of the thrust bolt in an orifice of the thrust bolt head.

16. A method according to claim 11, wherein the guide sleeve is attached to the housing by ultrasonic welding.

17. A method according to claim 11, wherein the guide sleeve is locked to the housing to attach the guide sleeve to the housing.

* * * * *